United States Patent
Lee et al.

(10) Patent No.: US 9,446,719 B2
(45) Date of Patent: Sep. 20, 2016

(54) HOLDER FOR MOBILE DEVICE AND VEHICLE SEAT EMPLOYING SAME

(71) Applicant: HON HAI PRECISION INDUSTRY CO., LTD., New Taipei (TW)

(72) Inventors: Chia-Yen Lee, New Taipei (TW); Wei-Che Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/641,636

(22) Filed: Mar. 9, 2015

(65) Prior Publication Data

US 2016/0137140 A1    May 19, 2016

(30) Foreign Application Priority Data

Nov. 19, 2014  (TW) .............................. 103140140 A

(51) Int. Cl.
| | | |
|---|---|---|
| A47C 7/62 | (2006.01) | |
| A47C 7/72 | (2006.01) | |
| B60R 11/02 | (2006.01) | |
| F16M 13/02 | (2006.01) | |
| B60N 2/64 | (2006.01) | |
| B60R 11/00 | (2006.01) | |

(52) U.S. Cl.
CPC ............. B60R 11/0252 (2013.01); B60N 2/64 (2013.01); B60R 11/0241 (2013.01); F16M 13/02 (2013.01); B60R 2011/0015 (2013.01); B60R 2011/0276 (2013.01)

(58) Field of Classification Search
CPC . B60N 2/64; B60R 11/0241; B60R 11/0252; B60R 2011/0015; B60R 2011/0276; F16M 13/02

USPC ............ 297/188.04, 188.05, 188.06, 188.07, 297/188.2, 217.3, 217.4
See application file for complete search history.

(56) References Cited

U.S. PATENT DOCUMENTS

| | | | | |
|---|---|---|---|---|
| 4,681,366 A | * | 7/1987 | Lobanoff ............. | B60N 2/4876 297/188.06 X |
| 4,792,183 A | * | 12/1988 | Townsend, III ....... | B60N 3/004 297/188.06 X |
| RE33,423 E | * | 11/1990 | Lobanoff ............. | B60N 2/4876 297/188.06 X |
| 6,394,551 B1 | * | 5/2002 | Beukema ............. | B60N 2/4855 297/217.3 |

(Continued)

FOREIGN PATENT DOCUMENTS

| | | | | | |
|---|---|---|---|---|---|
| CH | DE 102011075621 A1 | * | 11/2011 | ......... | B60R 11/0235 |
| CH | DE 102014206125 A1 | * | 10/2014 | ............. | B60N 3/004 |

(Continued)

Primary Examiner — Rodney B White
(74) Attorney, Agent, or Firm — Zhigang Ma

(57) ABSTRACT

A holder for mobile device includes a holding structure and a mounting structure. The holding structure includes a holding member and a supporting member coupled to the holding member. The holding member is configured to hold the mobile device. The mounting structure includes a mounting structure, a latching assembly and a sliding support coupled to the latching assembly. The mounting structure defines a compartment. The sliding support is slidably engaged with in the compartment and transitionable between: an enclosed configuration in which the sliding support is received in the compartment to allow the latching assembly to be received in the compartment; and an exposed configuration in which the sliding support and the latching assembly are exposed to outside of the compartment to allow the latching assembly to detachably latch with the supporting member.

15 Claims, 8 Drawing Sheets

(56) References Cited

U.S. PATENT DOCUMENTS

| | | | | |
|---|---|---|---|---|
| 6,698,832 B2 * | 3/2004 | Boudinot | B60N 2/4876 | 297/217.4 |
| 7,070,237 B2 * | 7/2006 | Rochel | B60R 11/0235 | 297/217.4 X |
| 7,111,814 B1 * | 9/2006 | Newman | B60R 11/0211 | 297/188.06 X |
| 7,201,443 B2 * | 4/2007 | Cilluffo | B60N 2/4876 | 297/188.04 X |
| 7,213,877 B2 * | 5/2007 | Gramss | B60N 2/4876 | 297/188.04 X |
| 7,364,230 B2 * | 4/2008 | Zheng | B60R 11/0235 | 297/217.4 X |
| 8,109,569 B2 * | 2/2012 | Mitchell | B60R 11/0235 | 297/217.3 X |
| 8,136,777 B2 * | 3/2012 | Brawner | B60R 11/0235 | 297/188.06 X |
| 8,210,605 B2 * | 7/2012 | Hough | B60N 2/4876 | 297/188.05 |
| 8,696,057 B2 * | 4/2014 | Wang | B60R 11/02 | 297/188.06 X |
| 8,780,282 B2 * | 7/2014 | Vitito | B60K 35/00 | 348/837 |
| 8,794,700 B2 * | 8/2014 | Brawner | B60R 11/02 | 297/188.06 X |
| 8,851,565 B2 * | 10/2014 | Hontz | B60N 3/004 | 297/188.04 |
| 8,864,226 B2 * | 10/2014 | Fan | B60N 3/004 | 297/188.06 X |
| 2001/0038220 A1 | 11/2001 | Massara et al. | | |
| 2004/0227861 A1 * | 11/2004 | Schedivy | B60N 2/4876 | 348/837 |
| 2007/0222248 A1 * | 9/2007 | Maulden | B60N 2/4876 | 297/217.3 X |
| 2008/0165293 A1 * | 7/2008 | Tranchina | B60R 11/0235 | 348/837 |
| 2008/0252798 A1 * | 10/2008 | Vitito | B60K 35/00 | 348/837 |
| 2009/0127897 A1 * | 5/2009 | Watanabe | B60R 11/0235 | 297/188.04 |
| 2010/0244505 A1 * | 9/2010 | Demick | B60N 2/4876 | 297/188.04 |
| 2011/0155873 A1 * | 6/2011 | Montag | B60R 11/02 | 248/218.4 |
| 2012/0241572 A1 * | 9/2012 | McClain | B60N 3/004 | 248/220.21 |
| 2013/0181492 A1 * | 7/2013 | Prescott | B60R 7/088 | 297/217.1 |
| 2014/0077539 A1 * | 3/2014 | Brawner | B60R 11/02 | 297/217.3 |
| 2014/0312665 A1 * | 10/2014 | Kucera | B60R 11/0235 | 297/217.3 |
| 2016/0114736 A1 * | 4/2016 | Tranchina | B60R 11/0235 | 348/837 |

FOREIGN PATENT DOCUMENTS

| | | |
|---|---|---|
| DE | 1021844 A1 | 10/2002 |
| DE | 202013100414 U1 | 2/2013 |
| EP | 1431107 A2 | 6/2004 |
| WO | WO2007109703 A2 | 9/2007 |
| WO | WO2010139452 A1 | 12/2010 |

* cited by examiner

HOLDER FOR MOBILE DEVICE AND VEHICLE SEAT EMPLOYING SAME

FIELD

The subject matter herein generally relates to holder for mobile devices, and particularly to a holder for mobile device used in a vehicle.

BACKGROUND

As society becomes more mobile and spends a greater amount of time traveling and away from home, demand rises for electronic devices that can be used outside the home environment. Mobile computing devices, such as cellular phones, tablet computers, are becoming more prevalent in today's society due to the ease in which they can be used in a mobile environment. These mobile computing devices are frequently used to view media content while traveling in vehicles.

BRIEF DESCRIPTION OF THE DRAWINGS

Implementations of the present technology will now be described, by way of example only, with reference to the attached figures.

DETAILED DESCRIPTION

Figure 1:
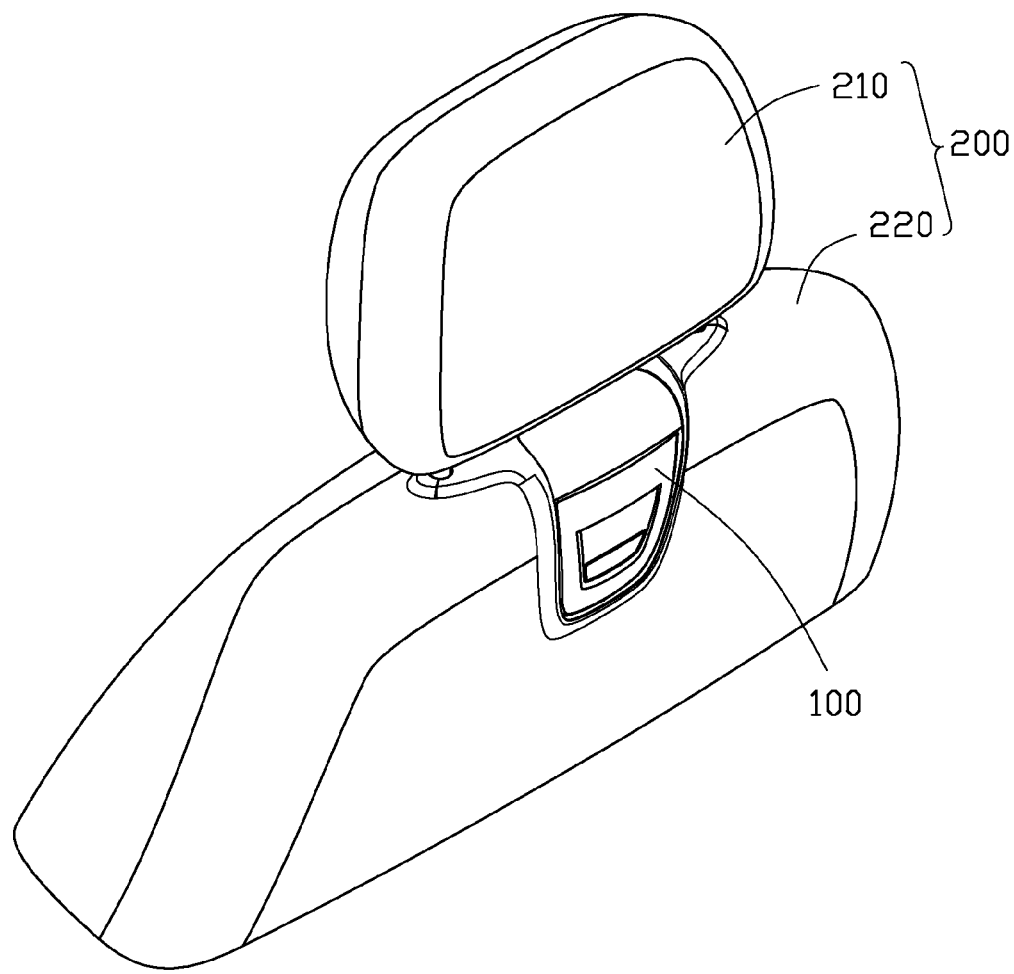
FIG. 1 is an isometric view of one embodiment of a vehicle seat having a holder for mobile device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts can be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

FIG. 1 illustrates an isometric view of one embodiment of a vehicle seat 200 having a holder 100. The vehicle seat 200 includes a headrest 210 and a seat back 220 coupled to the headrest 210. In one embodiment, the holder 100 is attached to a top of the seat back 220 adjacent to the headrest 210.

Figure 2:
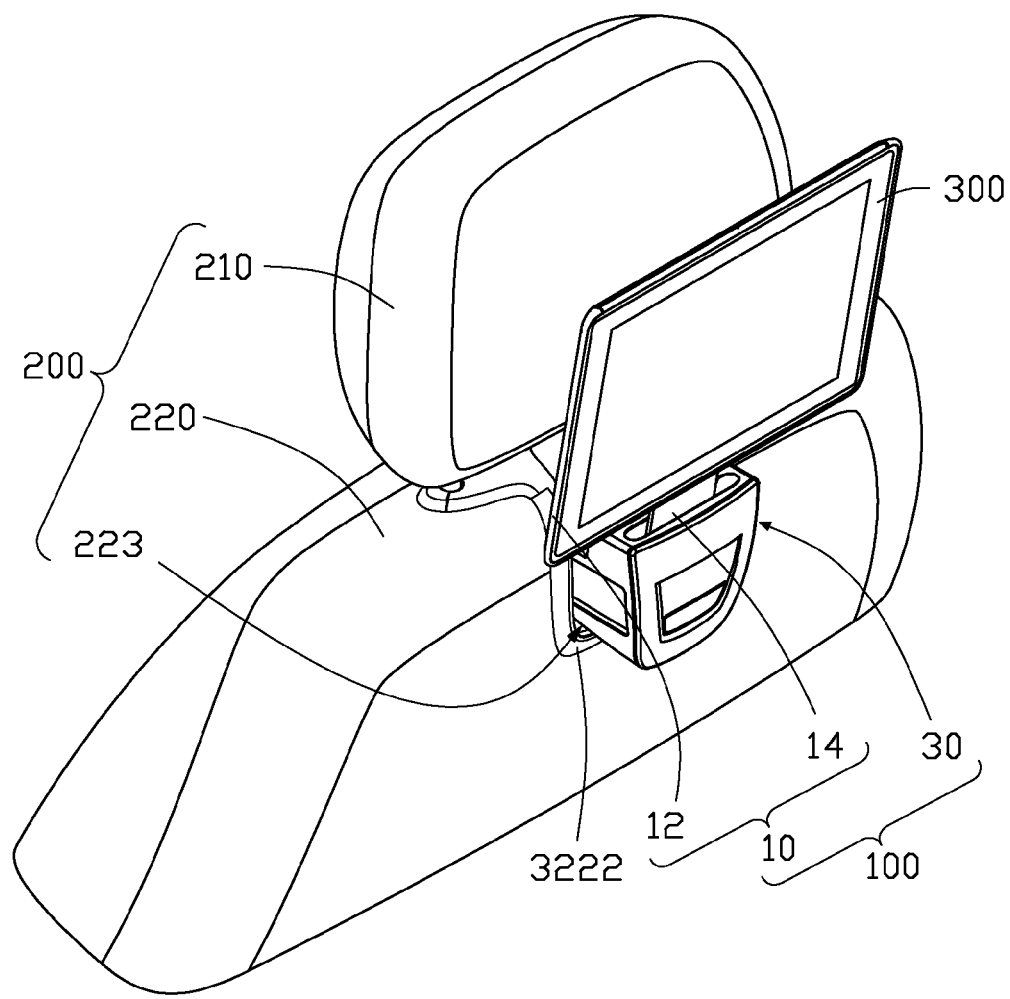
FIG. 2 is similar to FIG. 1, but showing the holder in another configuration.

FIG. 2 is similar to FIG. 1, but showing the holder 100 in another configuration. The seat back 220 defines an internal cavity 223. The holder 100 is configured to hold a mobile device 300, such as a cellular phone or a tablet computer, such that, the mobile device 300 can be steadily held on the seat back 220 through the holder 100.

The holder 100 includes a holding structure 10 and a mounting structure 30 coupled to the holding structure 10. The holding structure 10 includes a holding member 12 and a supporting member 14 coupled to the holding member 12. The holding member 12 is configured to hold the mobile device 300. In at least one embodiment, the holding member 12 has a shape similar to a protective cover, and is configured to cover on and accommodate the mobile device 300. The supporting member 14 can be detachably coupled to the mounting structure 30. The mounting structure 30 is slidably coupled to the internal cavity 223, such that the mounting structure 30 can be either completely accommodated in the internal cavity 223, or partially exposed to outside of the internal cavity 223 to hold the holding structure 10.

Figure 3:
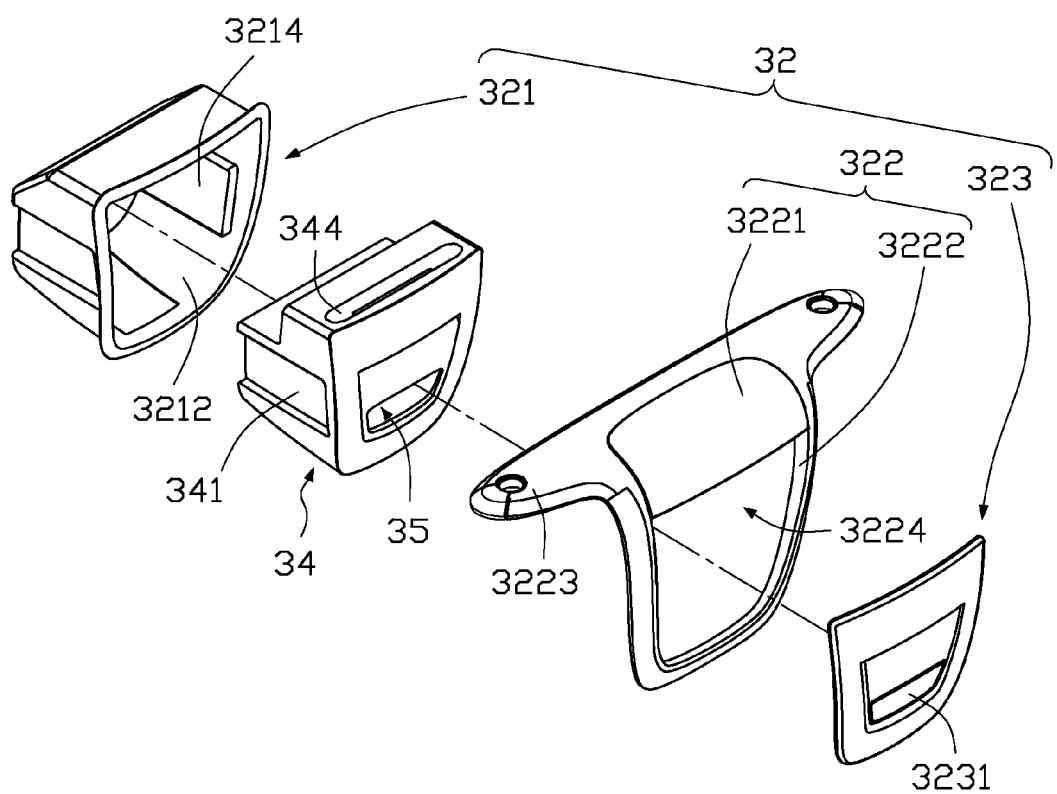
FIG. 3 is an exploded view of a mounting structure of the holder as shown in FIG. 2.

FIG. 3 illustrates an exploded view of the mounting structure 30 of the holder 100. The mounting structure 30 includes a housing assembly 32, a sliding support 34 and a latching assembly 35. The housing assembly 32 includes a receiving member 321, a fixing member 322 and a shield 323. The receiving member 321 can be received in the internal cavity 223, and defines a compartment 3212 configured to receive the sliding support 34. Two opposite rails 3214 protrude from an inner wall of the compartment 3212. Two sliding grooves 341 are recessed in two opposite surfaces of the sliding support 34. The sliding grooves 341 are slidably engaged to the two rails 3214, such that the sliding support 34 slidabely engaged with the compartment 3212 to be selectively received in the compartment 3212 or exposed to outside of the compartment 3212. It can be understood that, in another embodiment, the rails 3214 can protrude from the two opposite surfaces of the sliding support 34, the sliding grooves 341 can be recessed in the compartment 3212.

The fixing member 322 includes a main portion 3221 and an extending portion 3223 extending from the main portion 3221. The main portion 3221 is fixed to the seat back 220. In at least one embodiment, the main portion 3221 includes two shoulders 3222 extending from two opposite ends thereof. The shoulders 3222 are fixed to the top of the seat back 220. The extending portion 3223 is substantially perpendicular to the main portion 3221. The extending portion 3223 can cover on a peripheral edge of the internal cavity 223 (see FIG. 1) to fix the receiving member 321 in the internal cavity 223. The extending portion 3223 defines an opening 3224 facing the compartment 3212 of the receiving member 321. The opening 3224 is configured to allow the sliding support 34 to pass through.

The shield 323 is fixed to the sliding support 34 facing the latching assembly 35, and can move with the sliding support 34. The shield 323 has a shape and size corresponding the shape and size of the opening 3224, and is configured to cover the opening 3224 (see FIG. 5) when the sliding support 34 is received in the compartment 3212.

Figure 4:
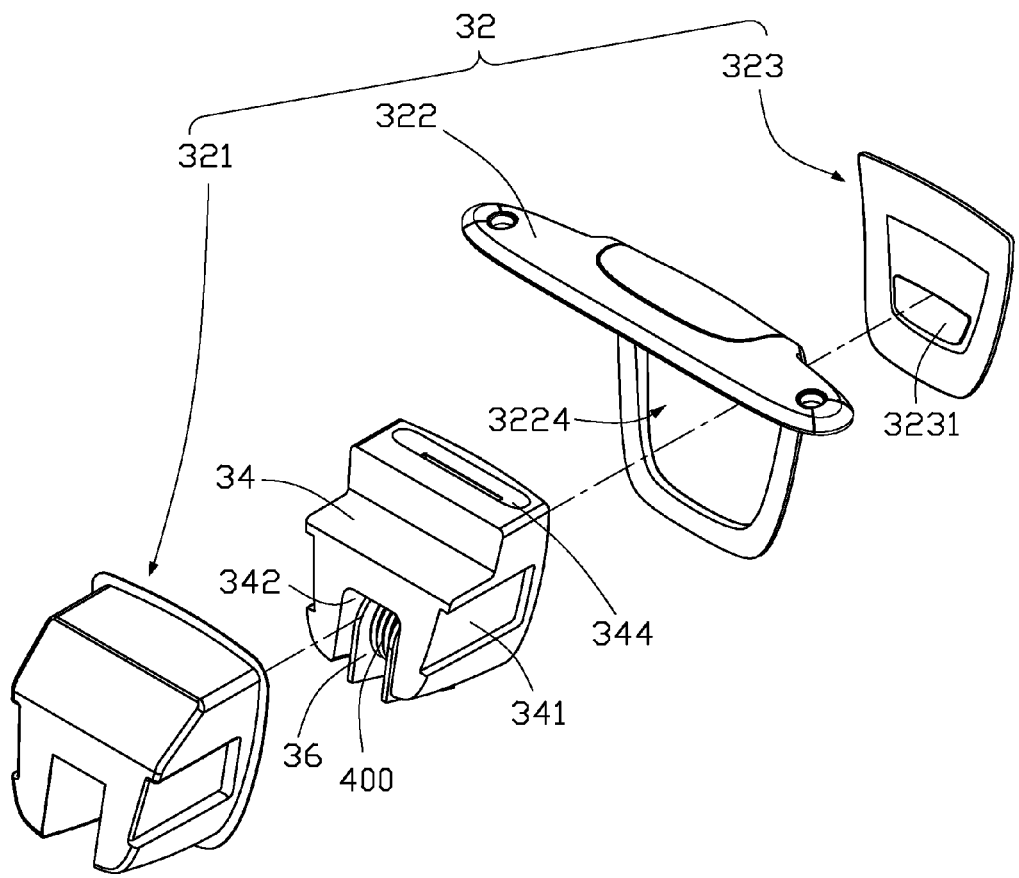
FIG. 4 is similar to FIG. 3, but showing the mounting structure from another angle.

FIG. 4 is similar to FIG. 3, but showing the mounting structure 30 from another angle. The mounting structure 30 is also provided with a cable spool 36 rotationally engaged with the sliding support 34. One or more cables, shown as a single cable 400, such as a USB cable, or a power cable, is coiled around the cable spool 36. One end of the cable 400 can be attached to a central computer (not shown) of the vehicle, another end of the cable 400 can be coupled with a connector (not shown) mating with the mobile device 300. When the sliding support 34 slides out of the compartment 3212, the cable 400 can extracted from the cable spool 36 to allow the connector to move the sliding support 34 for a user to use. In at least one embodiment, the sliding support 34 defines a chamber 342 adjacent to the receiving member 321 to receive the cable spool 36.

Figure 5:
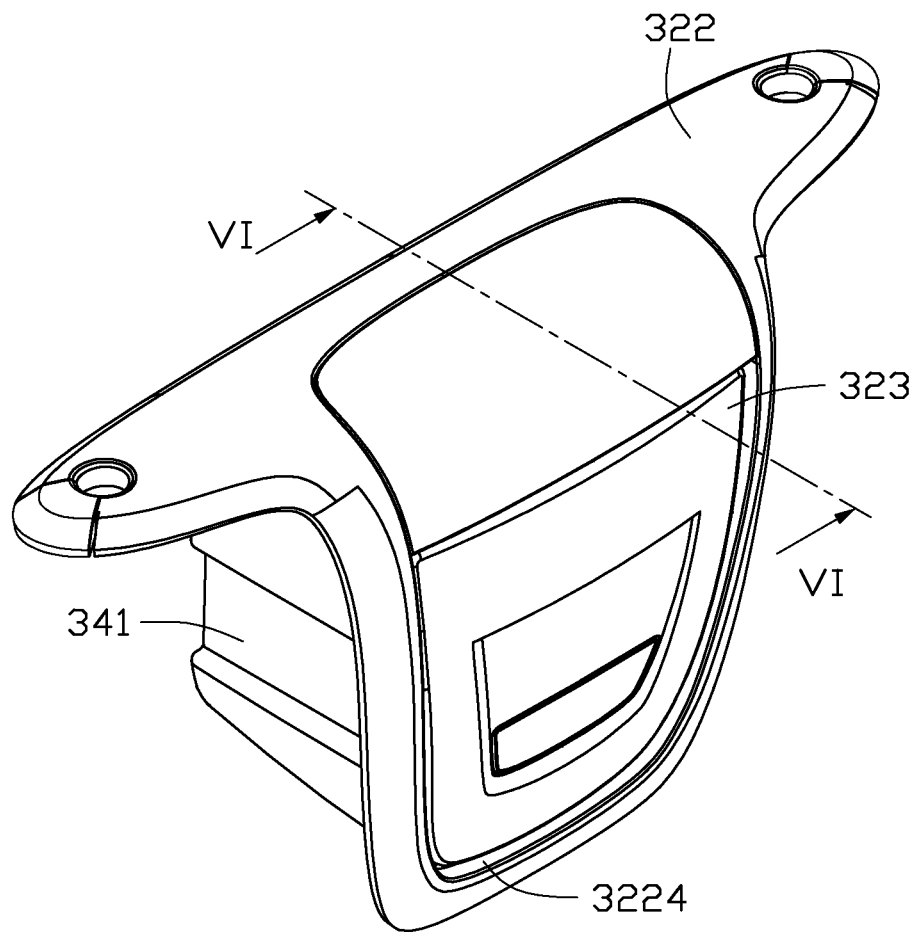
FIG. 5 is an isometric view of the mounting structure as shown in FIG. 3.
Figure 6:
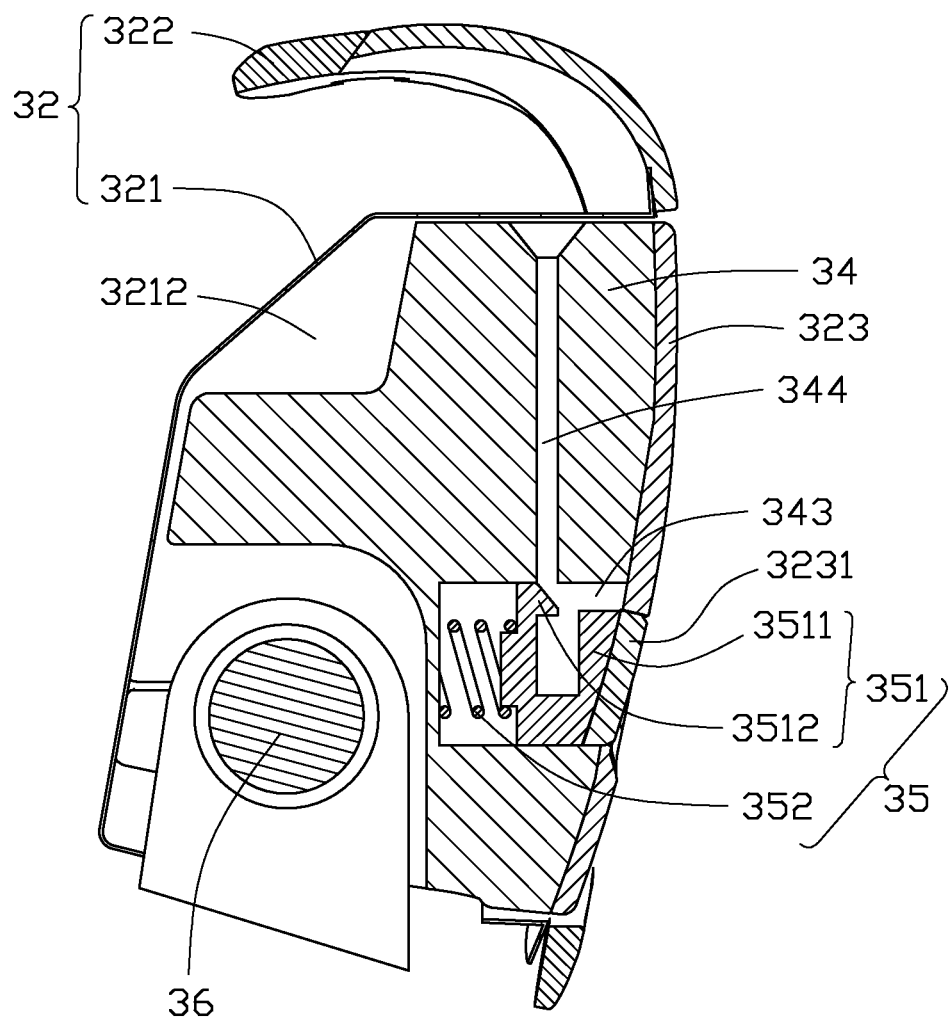
FIG. 6 is cross section view of the mounting structure as shown in FIG. 5 along lines VI-VI.

FIG. 5 illustrates an isometric view of the mounting structure 30 as shown in FIG. 3 and FIG. 6 illustrates exploded cross section view of the mounting structure 30 as shown in FIG. 5 along lines VI-VI. The sliding support 34 defines a receiving groove 343 and a channel 344. The receiving groove 343 is configured to mounting the latching assembly 35. One end of the channel 344 is communicated to the receiving groove 343, another end of the channel 344 opens at a surface of the sliding support 34. The latching assembly 35 includes a button 351 and an elastic member 352 elastically coupled between the button 351 and a bottom wall of the receiving groove 343. The button 351 is slidably received in the receiving groove 343, and includes a resisting portion 3511 and a latching portion 3512 facing each other. The latching portion 3512 elastically resists against the elastic member 352. In at least one embodiment, the elastic member 352 is a coil spring. The shield 323 has a pressing portion 3231 aligning with the resisting portion 3511. The pressing portion 3231 is configured to resist against the resisting portion 3511 to move the button 351.

Figure 7:
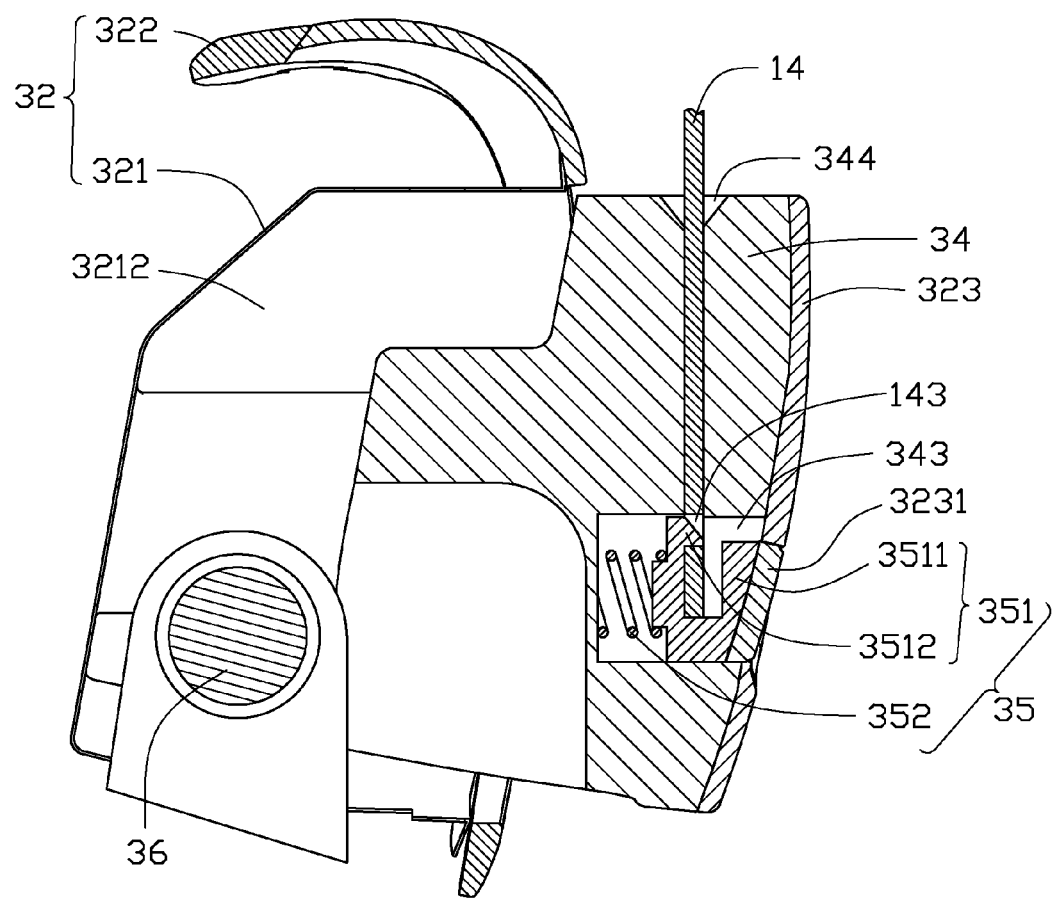
FIG. 7 is similar to FIG. 6, but showing a supporting member of the holder is latched to a button of the holder.

FIG. 7 is similar to FIG. 6, but showing the supporting member 14 is latched to the button 351. An end of the supporting member 14 defines a latching hole 143 configured to be detachably latched to the latching portion 3512 of the button 351. The sliding support 34 can extends at least partially outside the compartment 3212 to expose the channel 344. In at least one embodiment, the sliding support 34 can be pulled out of the compartment 3212 manually. It can be understood that, in another embodiment, the sliding support 34 can be ejected out of the compartment 3212 by an ejecting structure (not shown). The supporting member 14 can inserted in and pass through the channel 344 to allow the latching hole 143 to be latched with the latching portion 3512, such that the supporting member 14 can be held by the sliding support 34 to steadily hold the mobile device 300 as shown in FIG. 2. The elastic member 352 can provide a force to facilitate the latch between the latching portion 3512 and the latching hole 143.

Figure 8:
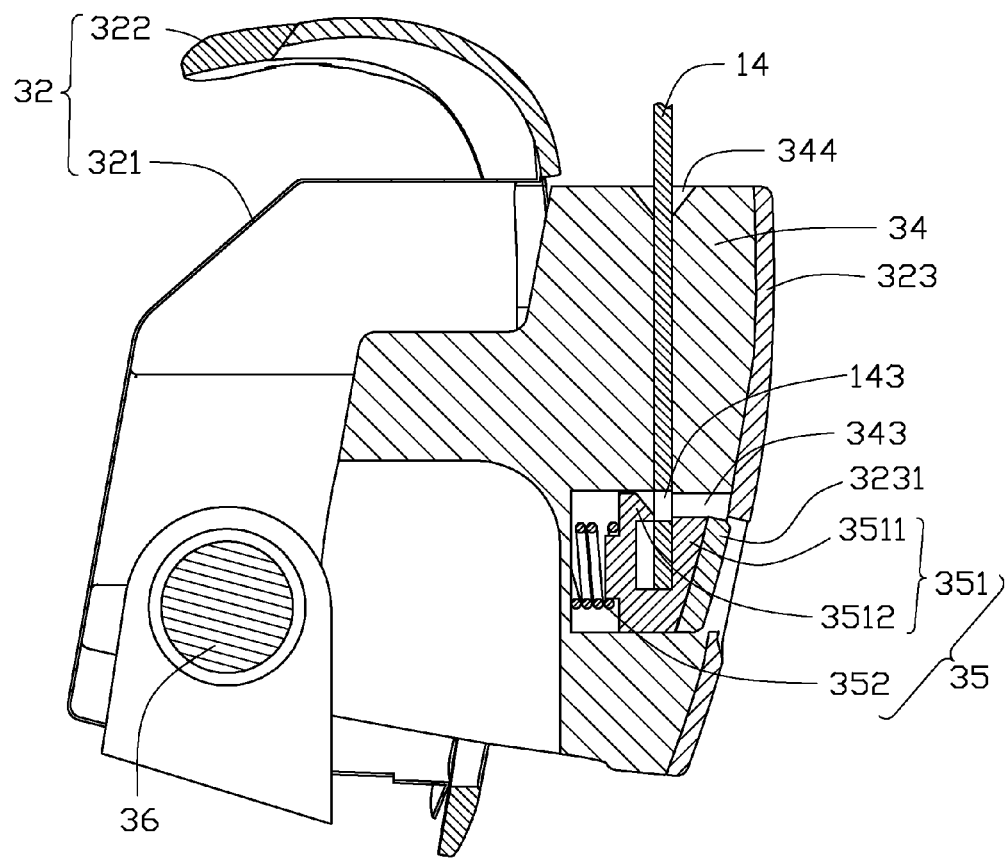
FIG. 8 is similar to FIG. 7, but showing the supporting member is detached from the button.

FIG. 8 is similar to FIG. 7, but showing the supporting member 14 is detached from the button 351. When the pressing portion 3231 is pressed, the pressing portion 3231 can drive the button 351 to move toward and compress the elastic member 352, such that the latching portion 3512 moves away from the latching hole 143 to detach from the latching hole 143, and the supporting member 14 can detach from the channel 344. In addition, when the pressing portion 3231 is released, the elastic member 352 can provide a force to drive the button 351 and the pressing portion 3231 to return back to their original position. The sliding support 34 can be retracted within the compartment 3212 to achieve a good appearance of the seat back 220, and the channel 344 can be blocked by the receiving member 321.

The embodiments shown and described above are only examples. Many details are often found in the art. Therefore, many such details are neither shown nor described. Even though numerous characteristics and advantages of the present technology have been set forth in the foregoing description, together with details of the structure and function of the present disclosure, the disclosure is illustrative only, and changes can be made in the detail, including in matters of shape, size and arrangement of the parts within the principles of the present disclosure up to, and including the full extent established by the broad general meaning of the terms used in the claims. It will therefore be appreciated that the embodiments described above can be modified within the scope of the claims.

What is claimed is:

1. A holder for a mobile device comprising:
    a holding structure comprising:
        a holding member configured to hold the mobile device; and
        a supporting member coupled to the holding member;
    a mounting structure comprising:
        a receiving member defining a compartment;
        a latching assembly configured to detachably latch with the supporting member; and
        a sliding support coupled to the latching assembly and slidably engaged with in the compartment; one of the sliding support and the compartment defining at least one sliding groove, the other one of the sliding support and the compartment protruding at least one rail, the at least one rail configured to slidably engage with the at least one sliding groove; the sliding support transitionable between: an enclosed configuration in which the sliding support is received in the compartment to allow the latching assembly to be received in the compartment; and an exposed configuration in which the sliding support and the latching assembly are exposed to outside of the compartment to allow the latching assembly to detachably latch with the supporting member.

2. The holder of claim 1, wherein the sliding support defines a receiving groove and a channel communicated to the receiving groove, one end of the channel opens at a surface of the sliding support; the latching assembly is received in the receiving groove, the supporting member is configured to pass through the channel to latch with the latching assembly.

3. The holder of claim 2, wherein the latching assembly comprises a button comprising a resisting portion and a latching portion facing each other, the supporting member defines a latching hole configured to detachably latch with the latching portion.

4. The holder of claim 3, wherein the mounting structure further comprises a shield coupled to the sliding support and facing the resisting portion; the latching assembly further comprises an elastic member elastically coupled between the latching portion and a wall of the receiving groove; the shield has a pressing portion aligning with the resisting portion; the pressing portion is configured to resist against the resisting portion to move the button to detach the latching portion from the latching hole.

5. The holder of claim 1, wherein the holding member is a cover configured to cover on and accommodate the mobile device.

6. The holder of claim 1, further comprising a cable spool rotationally engaged with the sliding support, wherein the cable spool is configured to be coiled around by a cable, and move with the sliding support when the sliding support slides.

7. A vehicle seat comprising:
a seat back; and
a holder for a mobile device comprising:
 a holding structure comprising:
  a holding member configured to hold the mobile device; and
  a supporting member coupled to the holding member;
 a mounting structure comprising:
  a receiving member defining a compartment;
  a latching assembly configured to detachably latch with the supporting member;
  at least one sliding support coupled to the latching assembly and slidably engaged with in the compartment; one of the at least one sliding support and the compartment defining at least one sliding groove, the other one of the at least one sliding support and the compartment protruding at least one rail, the at least one rail configured to slidably engage with the at least one sliding groove; the at least one sliding support transitionable between: an enclosed configuration in which the at least one sliding support is received in the compartment to allow the latching assembly to be received in the compartment; and an exposed configuration in which the at least one sliding support and the latching assembly are exposed to outside of the compartment to allow the latching assembly to detachably latch with the supporting member; and
  a fixing member configured to fix the receiving member to the seat back.

8. The vehicle seat of claim 7, wherein the at least one sliding support defines a receiving groove and a channel connected to the receiving groove, one end of the channel opens at a surface of the at least one sliding support; the latching assembly is received in the receiving groove, the supporting member is configured to pass through the channel to latch with the latching assembly.

9. The vehicle seat of claim 8, wherein the latching assembly comprises a button comprising a resisting portion and a latching portion facing each other, the supporting member defines a latching hole configured to detachably latch with the latching portion.

10. The vehicle seat of claim 9, wherein the mounting structure further comprises a shield coupled to the at least one sliding support and facing the resisting portion; the latching assembly further comprises an elastic member elastically coupled between the latching portion and a wall of the receiving groove; the shield has a pressing portion aligning with the resisting portion; the pressing portion is configured to resist against the resisting portion to move the button to detach the latching portion from the latching hole.

11. The vehicle seat of claim 7, wherein the holding member is a cover configured to cover on and accommodate the mobile device.

12. The vehicle seat of claim 7, wherein the holder further comprises a cable spool rotationally engaged with the at least one sliding support and a cable coiled around the cable spool, the cable spool is configured to move with the at least one sliding support when the at least one sliding support slides.

13. The vehicle seat of claim 7, wherein the fixing member comprises a fixing member and an extending portion extending from the fixing member; the fixing member is configured to be fixed to the seat back; the seat back defines a internal cavity configured to receiving the receiving member, the extending portion is configured to cover on a peripheral edge of the internal cavity to fix the receiving member in the internal cavity.

14. The vehicle seat of claim 13, wherein the extending portion defines an opening facing the compartment of the receiving member to allow the at least one sliding support to pass through.

15. A holder configured to support a mobile device having a display, the holder comprising:
a receiving member configured to define a compartment therein;
a sliding support slidably mounted in the receiving member and moveable between first and second positions, the first position being retracted within the compartment and the second position extending at least partially outside the compartment;
a mounting structure having a supporting member configured to support the mobile device;
a channel in the top of the sliding support configured to receive the supporting member;
a latch in the sliding support proximate to the channel configured to engage with the supporting member to lock the supporting member into the channel;
wherein when the sliding support is in the first position, the channel is blocked by the receiving member and the supporting member cannot be inserted in the channel; and
wherein when the sliding support is in the second position, the channel is accessible, and the supporting member can be inserted into the channel.

* * * * *